United States Patent [19]

Howard et al.

[11] Patent Number: 4,484,058

[45] Date of Patent: Nov. 20, 1984

[54] ELECTRON BEAM HOLE DRILLING APPARATUS

[75] Inventors: Curtiss G. Howard, Manchester, Conn.; Lester W. Jordan, Cranston, R.I.; Chester E. Yaworsky, Glastonbury; Frank L. Zampino, Enfield, both of Conn.

[73] Assignee: United Technologies Corporation, Hartford, Conn.

[21] Appl. No.: 361,665

[22] Filed: Mar. 25, 1982

[51] Int. Cl.³ .............................................. B23K 15/00
[52] U.S. Cl. ....................... 219/121 EJ; 219/121 EK; 219/121 ET
[58] Field of Search ................... 219/121 EH, 121 EJ, 219/121 EK, 121 EC, 121 ED, 121 EL, 121 ET, 121 LK, 121 LL, 121 LG, 121 LN

[56] References Cited

U.S. PATENT DOCUMENTS

| 3,175,073 | 3/1965 | Niedzielski et al. | 219/121 EZ X |
| 3,393,289 | 7/1968 | Duhamel et al. | 219/121 EZ |
| 3,491,226 | 1/1970 | Beadle | 219/121 ED |
| 4,271,348 | 6/1981 | Nakazaki et al. | 219/121 ET X |

FOREIGN PATENT DOCUMENTS 6720  1/1980  European Pat. Off. ..... 219/121 EL

OTHER PUBLICATIONS

"1975 Manual-Pratt U. Whitney K6-G10P A-D", Stiegerwald Strahltechnik, Puchheim, Frg, (1975), 15 selected pp. AS 1-AS 15.

Primary Examiner—C. L. Albritton
Attorney, Agent, or Firm—C. G. Nessler

[57] ABSTRACT

When drilling very small diameter holes in workpieces, there is a great tendency for expulsed workpiece material to travel back along the electron beam path, and to deposit as debris within the interior of the gun. The debris is caused to mostly land at a recess in the rim of a rotatable interior shield, positioned adjacent the beam path inside the gun. The deflection angle of the electron beam is precisely adjusted so that the expulsed workpiece material lands in the recess, from when it is removed by a scraper. A tab is placed within the recess at the rim of the shield, and helps remove small amounts of deposit which still adhere to stationary parts of the electron beam gun system adjacent to the shield. In this embodiment, a resilient scraper such as a wire brush, is used to remove adhering debris from the rim of the shield.

7 Claims, 7 Drawing Figures

ELECTRON BEAM HOLE DRILLING APPARATUS

DESCRIPTION

Technical Field

The present invention relates to the drilling of holes using electron beam energy.

BACKGROUND

In the past two decades the commercial use of electron beam energy machines in metalworking has grown considerably. A high electrical potential propells electrons at high energies toward a workpiece typically within a vacuum chamber, to cause melting. One of the most useful applications of electron beam energy has been for the drilling of holes in workpieces. The stream of electrons, which is precisely focused by means of magnetic fields, has been found capable of rapidly drilling rather small holes by a combination of melting and vaporization. Because of the high energy densities, of the order of $72 \times 10^6$ watts/cm$^2$, there is little general heating of the workpiece, inasmuch as a typical hole is created in the workpiece in a fraction of a second.

To achieve industrial utility, the manufacturers of electron beam machines had to make them durable. To be durable, the electron-producing filaments of the machines must be long lasting, and the energy content and concentration of the beam must be constant. Such goals have not been achieved without difficulty. The environment within the chamber where drilling takes place is characterized by flying droplets of molten metal and condensing metal vapor. The metal which is expelled from the workpiece tends to fly towards the electron gun components that create and guide the electron stream towards the workpiece. Therefore, various protective devices have been developed to protect them.

Generally, these devices comprise metal shields, typically in the form of rotating discs having adjacent scrapers remove the metallic debris which lands on them. The shields provide a space through which the electron beam can escape from the gun and impinge on the workpiece. While this hole is kept small, it is of necessity larger than the diameter of the beam for simple mechanical reasons, and to allow for purposeful deflection of the beam. Consequently, there is some tendency for a limited amount of debris to travel generally along the path of the beam, to the inside of the gun. In anticipation of this, there are provided other shields in the interior of the gun to capture this small amount of debris. They are similar in function to the primary shields.

The foregoing type of system works well for general applications. In most hole drilling, the conical shape of the metal expulsion is such that the bulk of it impinges on the primary shields. But drilling holes of very small diameter and great relative depth, particularly great quantities of workpiece metal expulsion are directed back through the primary shield opening, into the insides of a conventional electron beam gun. It has been found that the greater quantities of metal deposited in the insides of the gun cannot be accommodated by the internal shielding known in the prior art. Therefore, an improvement in the design of the drilling machine was necessitated.

DISCLOSURE OF INVENTION

An object of the invention is to provide shielding for an electron beam drilling apparatus which permits continuous drilling of a great number of holes, when relatively great quantities of expulsed workpiece material tend to travel back along the beam path.

In accord with the invention, a rotating disc shaped shield has a stepped periphery to provide a recess at its rim. The disc is positioned just above the electromagnetic deflection coil, and adjacent the electron beam path. The trajectory of the expulsed metal is carefully controlled by precise adjustment of the beam deflection angle, so that the expulsed workpiece metal is deposited in the stepped recess at the periphery of the disc. In a preferred embodiment of the invention the disc has a tab fixed within the recess, to aid in continuous removal of the slight amount of expulsed material which does not land in the recess, but is deposited on the adjacent electromagnetic coil. For this embodiment the conventional technique of using a continuously contacting scraper to remove debris deposited on rotating disc shields cannot be used. Thus, a wire brush, or other like object having resilience when contacted with the tab, is positioned in contact with the recess of the rotating disc, at a location away from the electron beam. The brush is in continuous contact with the rotating disc shield and therefore continuously removes material which is deposited.

During drilling the deflection angle is adjusted precisely to 9.75 degrees, whereas the nominal machine range is 10±0.5 degrees. Previously, metal depositing in the gun interior would diminish the beam strength and lead to incomplete hole penetration. The onset of the deviation was not readily detectable until after a sheet was removed from the drilling machine, meaning that sheets with entirely consistent and uniform holes could not be produced.

Thus, the invention makes feasible the manufacture of panels having a great multiplicity of very fine diameter closely spaced holes.

The foregoing and other objects, features and advantages of the present invention will become more apparent from the following description of preferred embodiments and accompanying drawings.

BEST MODE FOR CARRYING OUT THE INVENTION

Figure 1:
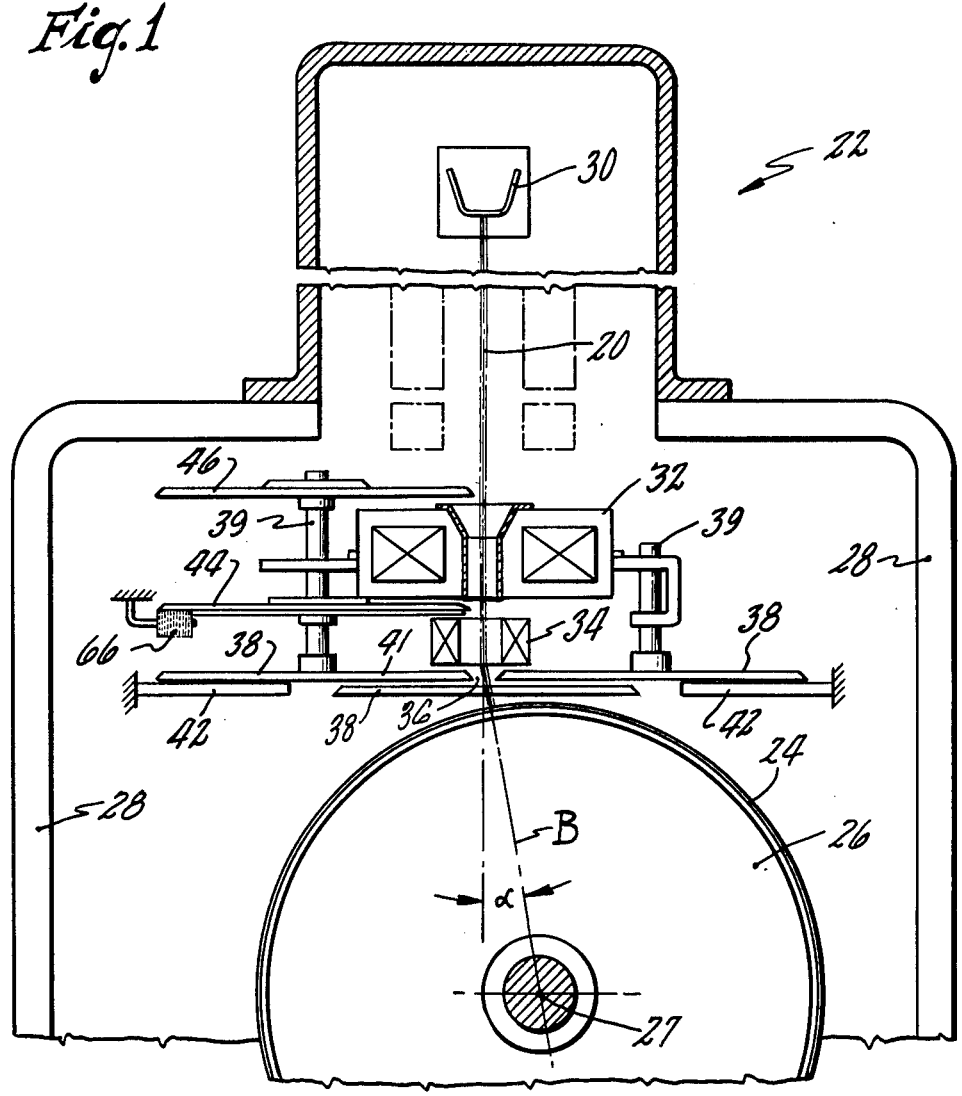
FIG. 1 is a partially cut away elevation view of an electron beam drilling machine, showing the beam in operation while drilling a workpiece.

FIG. 1 shows in side view some of the essential components of an electron beam drilling machine, such as are typically found in a Steigerwald Strahltechnik Model K6-G10P-CNC electron drilling machine (Steigerwald Strahltechnik, Messer Griesheim GmbH, Puchheim, Germany), which is used in the invention. An electron beam 20 is generated in a gun 22 and directed toward a sheet workpiece 24 which is mounted on a drum shaped rotatable workpiece holder 26. The workpiece holder is contained in a vacuum chamber 23, to which the electron beam gun is also attached. Most of the essential parts of the gun 22 for generating the electron beam are not shown since they are not necessary for an understanding of the invention. (For purposes of this application, the gun 22 is considered to comprise all the apparatus located above the plane of the shields 38.)

Essentially, the electron beam 20 is a stream of electrons which are emitted from the filament 30 and accelerated toward the workpiece by an applied electrical potential. The beam is shaped and guided by a system of electromagnetic devices. Near the end of its primary path in the gun, the stream of electrons passes through an electromagnetic lens 32 where it is concentrated, so that when it impinges on the workpiece it will have a well defined density and even distribution. The beam next passes through a deflection coil 34. The function of the deflection coil is to cause the beam to change its axial direction, so that it is caused to move along a secondary path B, which is at an angle $\alpha$ with respect to the z—z axis along which the beam previously traveled as it was formed within the gun. From the deflection coil, the beam travels through a small opening 36 between protective primary shields 38 and thereafter impinges on the workpiece 24. The energy of the electron beam is converted into heat when it impacts the workpiece, thereby causing melting and vaporization which creates a hole. In the Figure, the workpiece holder 26 is a cylinder, adapted to rotate about axle 27 and translate (in and out of the plane of the drawing). Usually it remains in continuous motion during drilling. The beam pulsates in coordination with the movement of the workpiece, and thus creates a multiplicity of holes in a predetermined pattern.

The elements just described are known in the prior art. FIG. 1 also shows elements of the invention which are discussed below, which cooperate with previously known elements.

Figure 2:
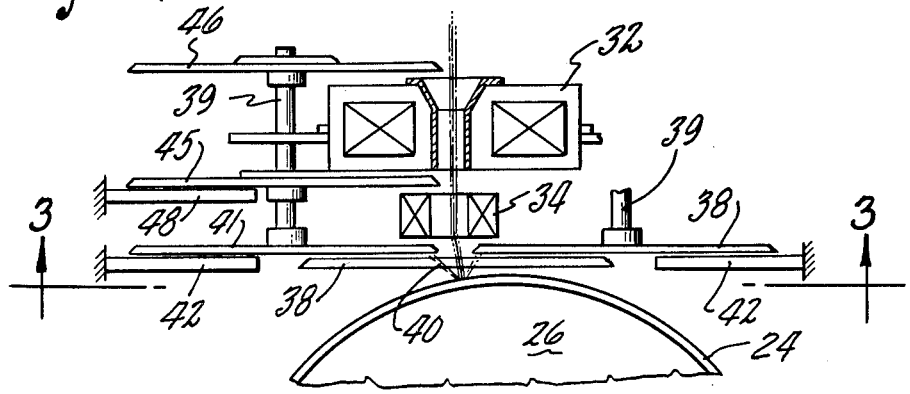
FIG. 2 is a more detailed view of apparatus like that shown in FIG. 1, and indicates the practice of the prior art.
Figure 3:
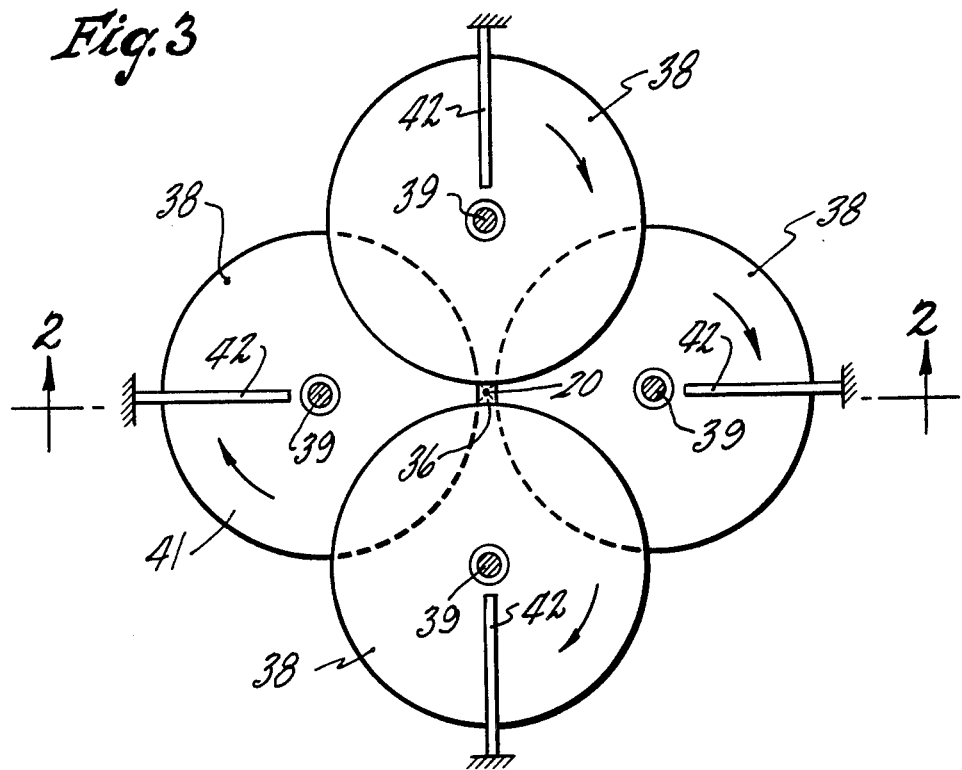
FIG. 3 is a vertically upward view of the apparatus shown in FIG. 2, and illustrates the pattern of primary debris shields.

A better appreciation of the invention will be gained by a further description of prior art apparatus shown in FIGS. 2 and 3. In closest proximity to the workpiece are four discs 38, three of which are shown in the Figures. They are positioned in overlapping configuration, as shown in FIG. 3 when viewed back along the beam path, to provide the small opening 36 through which the beam passes. When a typical workpiece hole, larger and of lesser aspect ratio than those described herein, is drilled, the expulsion is thrown out as a conical shaped spray 40. This spray will impinge on the lower surface of the discs 38 and often adheres to them as debris. The discs rotate continuously on motor driven shafts 39 during operation of the machine. Each disc has a scraper 42 in contact with its lower surface, at a location away from the opening 36; the scraper serves to continuously wipe off any debris which adheres to the disc. The beam is deflected purposely to lessen the amount of material which might travel back along the beam path and intercept the filament. But nonetheless, some debris will travel through the opening, along the beam path and up into the interior of the electron beam gun. Thus, as shown in FIGS. 1 and 2, there are additional discs located along the electron beam path, nearer to the filament, to intercept the debris. Both also rotate; one is fitted with scrapers. From FIG. 2 is it seen that there is a disc 45 located just above the deflection coil and another disc 46 located just above the electromagnetic lens. Both are located on the side of the beam opposite the workpiece, and have flat opposing surfaces with beveled peripheries. Debris which travels back along the beam path will tend to impact at the side of the machine where the discs 44,46 are located.

Figure 4:
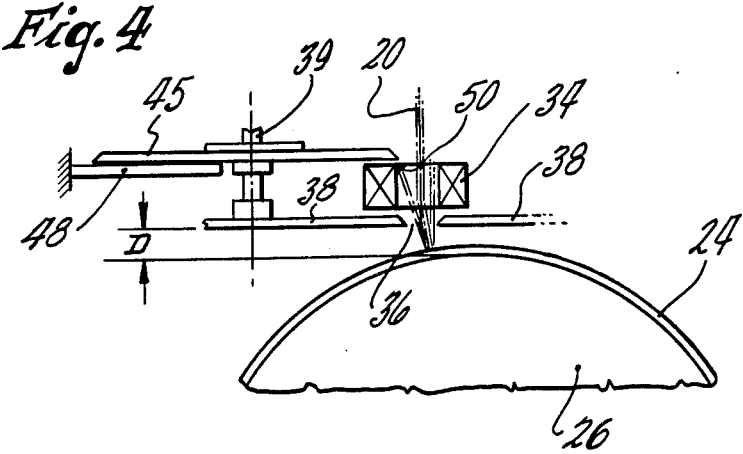
FIG. 4 shows still a more detailed view of prior art apparatus, but illustrates the problem which was discovered when very small diameter holes were drilled.

The foregoing arrangement tends to work well when drilling holes which are conventionally thought to be within the range of an electron beam drilling machine. But, when holes are drilled which have diameters of around 0.1 mm and high aspect ratios it is found that the included angle of the cone of expulsion is made much smaller, as illustrated by FIG. 4. Under such circumstances the lower shields 38 are less effective in blocking expulsion. Since the opening 36 through which the electron beam passes on its journey to the workpiece cannot be narrowed sufficiently, substantial quantities of workpiece material are propelled back inside the gun. They land in part on the interior shield 45, whereupon they are carried away and removed by the scraper. However, they also tend to land as deposits 50 on the deflection coil 34. Eventually, such as after drilling $10^5$ holes, debris accumulates radially inward to the point where it starts interfering with the beam 20 and prevents uniform drilling of holes. Also, if the debris 50 becomes loosened from the deflection coil, it can fall into the opening 36. Obviously, if it does not pass through the opening it presents a problem. But even if it does pass through it will momentarily interrupt the path of the beam. Typically holes are drilled at the rate of about 100-500 holes per second and even the momentary passage of an obstruction through the beam path will result in failure to create a quantity of the holes for which the machine is programmed to create.

From FIG. 4 it should be evident that greater deflection angle will not help the situation. A lesser angle of deflection is similarly ineffective because it tends to cause the expulsion to travel further up into the interior of the gun where analogous problems will be created.

The invention herein is needed to make workpieces which have a very great quantity of fine holes ($10^6$ or greater) all of which must be essentially uniform in dimension and spacing. To do this economically, it is essential that the holes be made at a high rate on a continuous basis. Even though making each hole comprises removal of a relatively small volume of material, the aggregate effect of the great number of holes is to cause a substantial amount of material to be expulsed and to travel back into the electron beam gun system.

Figure 5:
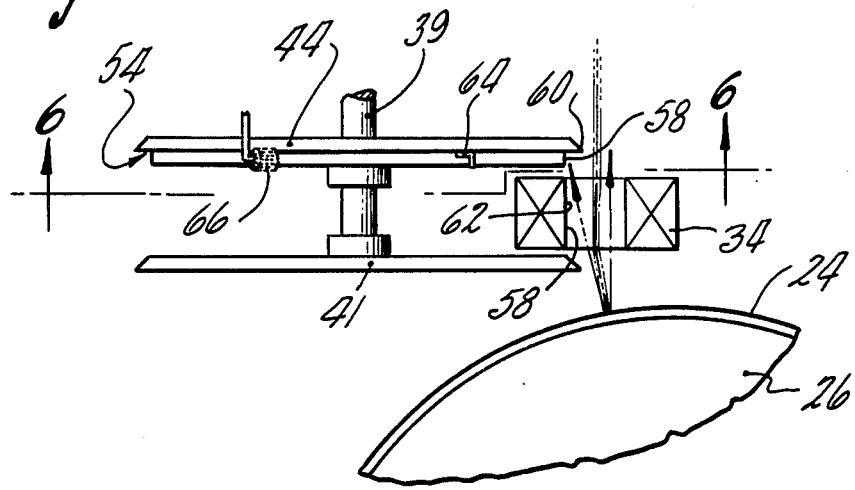
FIG. 5 is a detail side view of the apparatus, similar to FIG. 4, showing an inventive shield having a recess at its rim.
Figure 6:
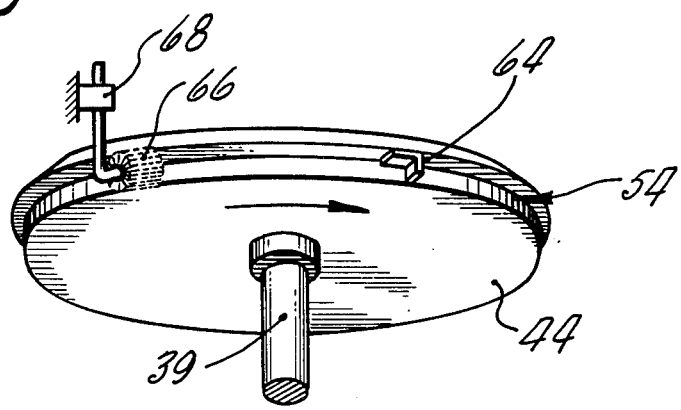
FIG. 6 is a perspective view of the inner shield shown in FIG. 5.

FIGS. 1, 5 and 6 shows how the shield located above the deflection coil is modified in accord with the invention. The interior shield 44 is a disc which has a stepped periphery, thereby forming a recess 54 about its rim. The cylindrical diameter 56 of the recess is approximately aligned with the inside diameter 58 of the deflection coil 34. The outermost circumference or rim 60 of the shield is made to lie in as close a proximity to the beam as possible. Generally, the outer rim lies in the same position as the outer rim of the shield of the prior art. We have found that a 7.6 mm thick brass disc with an outer diameter of 27.6 cm and a step diameter of 25.8 cm to be effective. The recess is about 9 mm radially by about 3.8 mm axially. In use, the angle of deflection is varied very carefully to cause the expulsion to land within the recess 54. We made and refined our invention while drilling 6 mm thick Ti-6Al-4V sheet. The standard deflection angle α for the machine is 10 degrees ±30 seconds. However, good results will not be obtained unless the deflection angle is critically set. For the Model K6-G10P-CNC drilling machine, we have found that the angle α must be 9.75 degrees, when the machine reference distance D (in FIG. 4) is 20 mm. There is some tolerance on the angle, of course, but it must be held to within less than ±0.25 degrees to cause the deposits to concentrate within the recess. Somewhat different deflection angle may be used when drilling other materials with other parameters or machines, but to practice our invention reasonable experiment will reveal the angle necessary to cause concentration of the debris in the recess of the interior shield. Once the angle is set, it is important that the location distance D of the workpiece be maintained accurately, with respect to the electron beam gun reference plane. In our practice of the invention, we have maintained this within ±0.2 mm, or about 0.5 percent.

The interior shield 45 is conveniently located on the same shaft 39 as the primary shield 38, 41; and it continuously rotates at about 4 revolutions per min. A scraper 66 engages the recess, at the side of the disc away from the beam, to remove debris. Notwithstanding the foregoing improvement, small quantities of material will still be found to land on the deflection coil 34 at a point 62 which is proximate to the shield, and opposite the direction of beam deflection. The debris will take longer to accumulate and cause less beam trouble than if the recessed shield were not present, but it still needs to be eliminated for sustained drilling operation. Thus, we attach at least one tab 64 in the recess at a point on the circumference. The tab is shown in more detail in FIG. 6. The tab physically dislodges small accumulations of debris on the deflection coil, on a continuous basis. Other protuberances like the tab may be used, so long as they contact the debris adhered at the point 62 to the deflection coil on a periodic basis. Of course, more than one tab may be used, although we have not found this to be necessary.

While the tab on the shield disc is the simplest way of continuously removing deposits, other effective mechanical ways of scraping material from the interior of the electromagnet near the shield, or of preventing its deposit, will be useful in cooperation with the shield function.

While the debris will fall downward along the beam path onto the lower shields, and possibly through the hole 36, this aspect does not seem to cause a problem in practice. The presence of the tab means that a conventional scraper, such as a rigid knife shaped piece 42 used for other discs, 38, 45, 46 cannot be used. Thus, as shown in FIGS. 1 and 6, we use a wire brush 66, mounted off a support 68. The bristles of the wire brush have sufficient resilience so that when the tab intercepts them they are bent aside, and then spring back into location once the tab passes. Other means other than the wire brush may be used to remove the deposits from the recess at the periphery of the disc. Included within this is any member which is adapted to deflect under action of the tab, but which has sufficient strength and force to contact with the disc, to remove the metal deposits.

Figure 7:
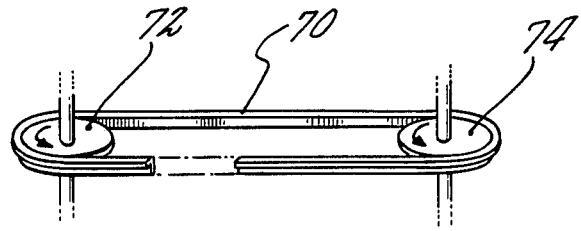
FIG. 7 illustrates another embodiment of the invention, whereby an angled cross section belt is supported between two pulleys.

Other embodiments of the invention are within contemplation. The general method and principle underlying our invention is to have the expulsion land in the recess of a movable interior shield. To do this, the shield having the recess must be provided above the deflection coil, and the angle of the deflection must be adjusted to aim the expelled workpiece material. There are other configurations which a skilled mechanic might use to carry out the objects of the invention. As an example, FIG. 7 shows an angular cross section belt shaped member 70, mounted between two pulleys 72, 74. The pulley 74 would be positioned within the electron beam gun at the same locations as the disc 44, in FIGS. 1 and 5.

We have indicated the criticality of adjusting the deflection angle, to cause the expulsed material to land in the recess of the rim. We stress this point, since a great quantity of material which is thrown back inside the gun means that even relatively small fractions of the material which are not captured at the rim of the interior shield can cause problems. However, we believe to have generally discovered the utility of movable shields having stepped or recessed rims. We have found our design to be advantageous, even when more normal hole drilling takes place, and control of the deflection angle is not particularly critical.

Although this invention has been shown and described with respect to a preferred embodiment, it will be understood by those skilled in the art that various changes in form and detail thereof may be made without departing from the spirit and scope of the claimed invention.

We claim:

1. Apparatus for electron beam drilling a workpiece comprising a chamber for receiving and holding a workpiece; an electron beam gun, attached to the chamber, the gun containing a filament for emitting electrons, a system of electromagnets for shaping and guiding the electrons into a beam travelling along a primary path within the gun, the path extending into the chamber; and primary shields positioned at the end of the gun proximate the workpiece holding zone within the chamber, characterized by an interior movable shield mounted among the system of electromagnets and along the beam path within the gun, the shield having a recess at its periphery to receive debris in the form of material expulsed from a workpiece and travelling generally along the beam path, the motion of the shield conveying debris received in the recess to a location spaced apart from the beam path; and means for removing debris from the recess, positioned at the said location.

2. The apparatus of claim 1 characterized by means for continuously removing debris from a stationary part of the gun adjacent the location at which debris is received on the shield, said means cooperating with the action of the shield to keep debris from accumulating adjacent the beam path.

3. The apparatus of claim 1 wherein the system of electromagnets in the gun comprises a final stationary deflection electromagnet located proximate the primary shields, to cause deflection of the beam from its primary path as it passes through the primary shields, characterized by an interior movable shield which is a rotatable disc having a stepped outer rim to provide the recess, the shield positioned along the beam path of the filament side of the deflection electromagnet and opposite the direction of beam deflection during drilling.

4. The apparatus of claim 3 characterized by a tab fixed in the recess of the shield rim, to dislodge debris adhering to the stationary electromagnet.

5. The apparatus of claim 4 characterized by a resilient wiper for continuously removing debris from the recess of the shield rim.

6. The method of drilling a multiplicity of fine diameter holes in a workpiece which comprises generating a stream of electrons flowing along a first axis of an electron beam gun; deflecting the electrons as they emanate from the gun as a beam, so they travel along a second axis at an angle to the first axis; positioning a workpiece along the second axis so that the electron beam drills a multiplicity of fine diameter holes in the workpiece, thereby causing some expulsed molten workpiece material to travel along the second axis into the gun; characterized by adjusting the angle of deflection to cause the expulsed material to deposit on a recess on the rim of a movable interior shield positioned within a gun; transporting the deposited material on the rim to a point away from the point of deposition by motion of the shield; and continuously removing expulsed material from the rim.

7. The method of claim 6 characterized by continuously removing material deposited on stationary parts of the gun adjacent to the interior shield.

* * * * *